L. B. DEMUTH.
IRRIGATION DEVICE.
APPLICATION FILED APR. 9, 1914.
1,112,271.
Patented Sept. 29, 1914.
2 SHEETS—SHEET 2.
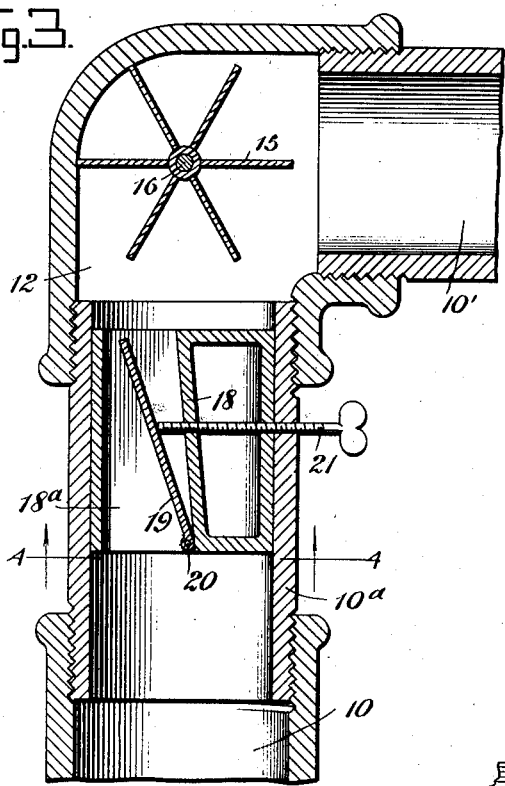
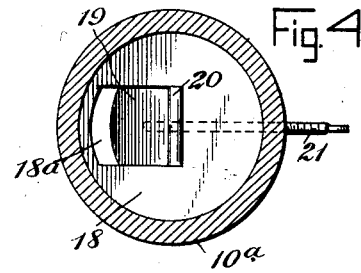
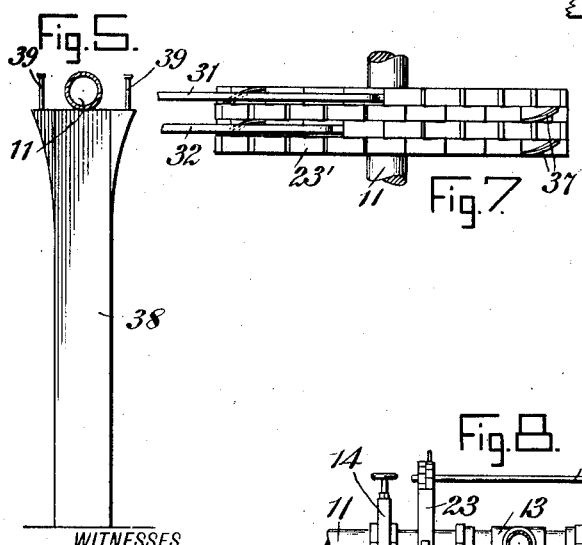
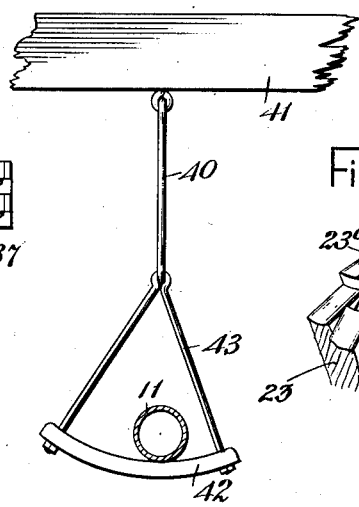
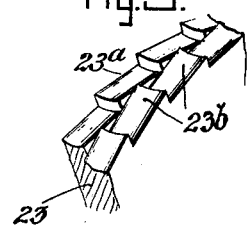
WITNESSES
INVENTOR
Luther B. Demuth
BY
ATTORNEYS

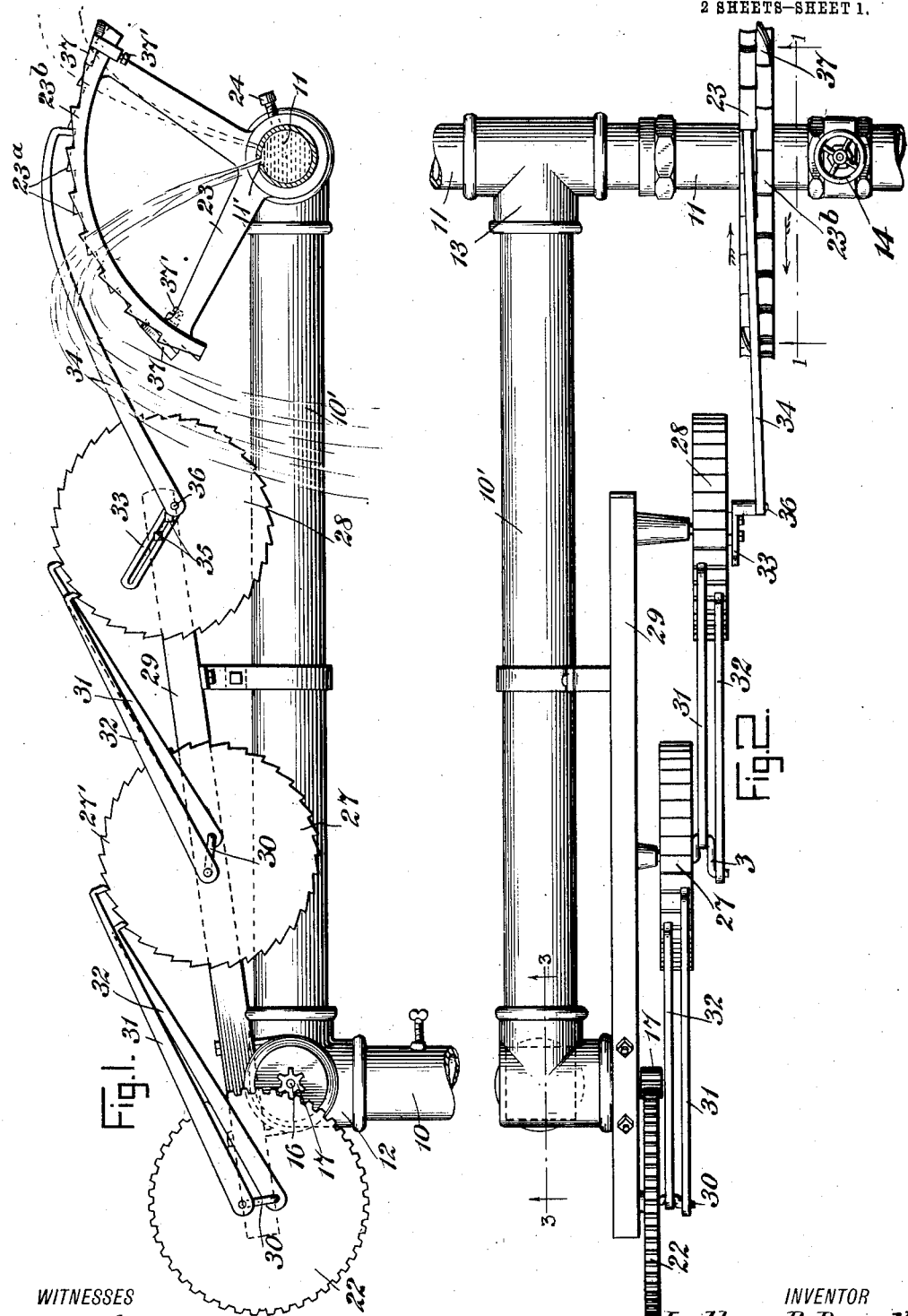

UNITED STATES PATENT OFFICE.

LUTHER B. DEMUTH, OF BEIDLER, OHIO.

IRRIGATION DEVICE.

1,112,271.  Specification of Letters Patent.  Patented Sept. 29, 1914.

Application filed April 9, 1914. Serial No. 830,606.

*To all whom it may concern:*

Be it known that I, LUTHER B. DEMUTH, a citizen of the United States, and a resident of Beidler, in the county of Tuscarawas and State of Ohio, have invented a new and Improved Irrigation Device, of which the following is a full, clear, and exact description.

This invention relates to water distribution, and has particular reference to irrigating devices which are of an automatic or practically automatic nature.

Among the objects of the invention, therefore, is to provide a water supply or main pipe with connections from it to a distributing nozzle pipe extending along above the surface of the earth to be irrigated any desired distance, said pipe line or nozzle pipe being provided with perforations for spraying the water laterally from the vertical plane of the pipe.

A further object of the invention is to provide a motor operated by the flow of water through or from the main pipe, connections between the motor and the nozzle pipe being provided whereby the nozzle pipe may be caused to oscillate around its axis for the purpose of changing the direction of the spray.

A still further object of the invention is to provide means in connection with the power connections above referred to whereby the extent of oscillation and also the speed of oscillation of the nozzle pipe may be varied or controlled according to the various conditions to be provided for, such as variations in force of the water and the amount of water to be supplied to the earth.

The foregoing and other objects of the invention will hereinafter be more fully described and claimed and illustrated in the drawings forming a part of this specification in which like characters of reference indicate corresponding parts in all the views, and in which—

Figure 1 is a side elevation of that portion of the main water pipe having associated with it the operation mechanism for the spraying pipe, the spraying pipe being in section on the line 1—1 of Fig. 2; Fig. 2 is a plan view corresponding to Fig. 1; Fig. 3 is a vertical section on the line 3—3 of Fig. 2; Fig. 4 is a transverse section on the line 4—4 of Fig. 3; Fig. 5 is a detail view indicating one means for supporting the spraying pipe, such as may be used at points remote from the main pipe; Fig. 6 is another form of supporting means for the spraying pipe; Fig. 7 is a modification of the ratchet mechanism for connection to the spraying pipe; Fig. 8 is a detail view indicating the manner of so connecting two independent spraying pipes in alinement as to provide for oscillation of either of them independently of the other or both together, if desired; and Fig. 9 is a detail referred to below.

The several parts of this device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings, I show at 10 a water main which may convey water in any desired direction for delivery to the spraying pipes 11. By way of illustration of one arrangement of pipes, I show an elbow 12 leading from the end of the main 10 and delivering water therefrom into and through a connecting pipe or main 10' which is connected by means of a T coupling 13, the pipes 11 being preferably swiveled in said T for independent oscillation. As above premised, each of the pipes 11 is provided along one side with any suitable number or size of spraying holes 11' radially formed through the pipe. Each of the pipes 11 also is provided with a cut-off valve 14 for controlling the water passing into and through the same.

At 15 I show a wheel journaled at 16 transversely in the elbow 12 and having on the end of the shaft a pinion 17. The paddle wheel 15 is adapted, therefore, to rotate substantially freely around the axis of a shaft 16 under the action of the water passing through the main 10 toward the spraying pipes.

Adjacent the paddle wheel the main 10 is provided with a flow regulator 18, the same comprising a substantially hollow cylindrical plug secured in the main 10 or the coupling 10ᵃ connected thereto. Said regulator is provided with a vertical tapered space 18ᵃ extending upwardly therethrough for directing the current of water against one side of the paddle wheel. A wing 19 is pivoted on a horizontal pivot 20 adjacent the lower end of the plug and extends upwardly in said tapered opening. At 21 I show a screw passing through the wall of the coupling 10ᵃ and also through the main portion of the plug of the regulator and bearing against one side of the wing 19. By turning the screw in I reduce the passage remaining between the wing and the opposite side of the opening 18ᵃ and thereby I reduce the flow of water but increase the driving action thereof upon the paddle wheel.

The power developed from the rotation of the paddle wheel and its shaft 16 may be utilized to control the direction of delivery of the water from the spraying pipes by any suitable mechanism. As an illustration of means which I have found in practice to be suitable, I provide a gear 22 meshing with the pinion 17 and driven therefrom at a comparatively slow speed. Connected to one of the pipes 11 is a peculiar form of ratchet wheel or member shown in the several views as comprising two or four sets of ratchet teeth, one series being arranged in an opposite direction from the series next adjacent. One form of this member is shown at 23 in Figs. 1 and 2, and having two series of ratchet teeth extending through substantially a quarter of a circle. This wheel or member is clamped to the pipe 11 by means of a set screw 24. As suggested in Fig. 8, the pipe 11 opposite the T 13 has clamped to it an angularly formed arm 25 as by means of a set screw 26, said arm extending horizontally parallel to the nozzle pipes, and is connected with the member 23. When both of the set screws 24 and 26 are tightened, an oscillatory movement imparted to the member 23 will cause simultaneous oscillation of both of the pipes 11. If, however, either of the set screws be loosened, the pipe adjacent thereto will be allowed to remain stationary while the other will continue to oscillate in synchronism with the movements of the member 23. The cut-off valves 14 will, of course, be manipulated according to the intention of the operator with regard to the distribution of water through either of the pipes.

Any suitable connecting means may be employed between the gear 22 and the oscillating member 23 whereby rotation imparted to the gear 22 may cause comparatively slow oscillatory movement of the nozzle pipes. Since the speed of the paddle wheel 15 is comparatively high, for adjustment of the nozzle pipes around their axis may be comparatively slow I prefer to use means such as shown in Figs. 1 and 2, including intermediate ratchet wheels 27 and 28 which may be of similar form and journaled upon a frame 29 which also may support the driving gear 22. The gear 22 is provided with a double crank 30 upon which are pivoted a pair of pawls 31 and 32 having hooks engaging alternately with the teeth 27′ of the ratchet wheel 27. The relation between the throw of the cranks 30 and the length of the teeth 27′ may be varied according to the desire of the operator or builder of the machine, but, as indicated, one complete rotation of the wheel 22 will cause each of the pawls 31 and 32 to rotate the ratchet wheel 27 through an extent of about one tooth. The ratchet wheel 27 likewise is provided with a double crank 30 having pawls 31 and 32 similar to those above described and having a similar action upon the ratchet wheel 28. At 33 I provide for the wheel 28 an adjustable wrist pin to one end of which is pivoted a single pawl 34. By adjustment of the wrist pin 33 along locking screws 35, I am able to vary the radial throw of the pivot 36 to which the pawl 34 is connected. The pivot connection just referred to is sufficiently loose to permit the pawl 34 to engage with either of the series of teeth 23ᵃ or 23ᵇ, means being provided of any suitable nature for deflecting the pawl laterally from one series to the other at any desired time so as to vary the extent of angular rotation of the nozzle pipes. As shown in Fig. 9, I prefer to make the bottoms of the teeth just referred to concave in cross section, whereby the pawl 34 will glide by gravity from one to the other in the same series without danger of being deflected under ordinary conditions to the other series. When, however, the end of the series is reached or it is desired to change the direction of oscillation of the nozzle pipes, I apply a shoe 37 opposite the last tooth, said shoe being provided with a flange or rib serving to cause the pawl to be deflected laterally to the opposite series of teeth. A shoe of similar character at the opposite end of the other series will have the effect to return the pawl to the first series again. These shoes may be of any suitable construction and are adapted to be set as by means of a set screw 37′ at any place desired.

Under some conditions it may be desired to increase the relative speed of the nozzle pipes with respect to the paddle wheel as, for instance, when the flow of water is such as to provide for a slow speed of the paddle wheel and hence I may dispense with one or both of the intermediate ratchet wheels 27 and 28, and the pawls 31 and 32 may either operate from the wheel 22 upon the ratchet wheel 28 or it may be so re-arranged as to operate directly upon a pipe member 23′. As shown in Fig. 7, this member may have four series of ratchet teeth and the two series thereof having the teeth arranged in the same direction may be acted upon in alternation but in the same direction by the pawls 31 and 32. Similar guide shoes 37 may be employed in this form of the invention to deflect the pawls laterally as above described.

The nozzle pipes will be understood to be adapted to be made of considerable length, perhaps a thousand feet, and hence means must be provided to support them for limited rotation with a minimum amount of friction. As shown, for instance, in Fig. 5, the pipes may be supported upon fixed standards or posts 38 and held from rolling from the tops thereof by means of pins 39 arranged on opposite sides of the pipe. Where it is possible to employ overhead supports, I prefer to use that form of support shown in Fig. 6 which includes a link 40 suspended from a fixed overhead support 41 and pivoted upon the lower end of the link 40 is an arc-shaped rigid bearing member 42. This member 42 is supported by a yoke 43 from the link 40, the point of connection between the link and the yoke constituting the center of curvature of the bearing surface thereof. The pipe 11 is adapted to rest within the yoke 43 as indicated and by the action of gravity will be held substantially beneath the link 40. Upon rotation of the pipe 11 through a limited angle, it will cause the member 43 to roll beneath it by rolling instead of sliding friction.

Having thus described my invention, I claim as new and desire to secure by Letters Patent:—

1. In a device of the character set forth, the combination with a water main and a plurality of horizontal spraying pipes arranged in alinement with each other and adapted to receive water from said main, of means to control the delivery of water through said spraying pipes, power means set in operation by the flow of water through the main, and connections between the power means and said pipes whereby either of said pipes may rotate while the other may remain inactive.

2. In an irrigating device, the combination of a water main, a distributing nozzle communicating therewith and adapted to deliver water therefrom, an actuating member secured to said spraying nozzle for oscillation thereof around a horizontal axis, said actuating member having two series of ratchet teeth arranged thereon parallel to each other but extending in opposite directions, a rotary power wheel, a pawl pivoted to said power wheel and adapted to coöperate with either of said series of ratchet teeth, and means to cause the pawl to be deflected from one series to the other for reversing the rotation of the distributing nozzle automatically.

3. In an irrigating device, the combination of a water main, a horizontal distributing pipe communicating with said main and adapted to deliver water therefrom, an actuator comprising an arc-shaped member secured to the distributing pipe and comprising a plurality of series of ratchet teeth, the teeth of one series being reverse to those of the series adjacent thereto, a rotary power wheel, and reciprocating means actuated from said power wheel and coöperating with said actuator for oscillation of the distributing pipe.

In testimony whereof I have signed my name to this specification in the presence of two subscribing witnesses.

LUTHER B. DEMUTH.

Witnesses:
ELMA M. PATRICK,
JAMES G. PATRICK.